(12) United States Patent
Kitamura

(10) Patent No.: US 8,131,682 B2
(45) Date of Patent: Mar. 6, 2012

(54) SYSTEM AND METHOD FOR REPLACING CONTENTS ADDRESSABLE STORAGE

(75) Inventor: Manabu Kitamura, Kanagawa (JP)

(73) Assignee: Hitachi, Ltd., Tokyo (JP)

( * ) Notice: Subject to any disclaimer, the term of this patent is extended or adjusted under 35 U.S.C. 154(b) by 1387 days.

(21) Appl. No.: 11/431,533

(22) Filed: May 11, 2006

(65) Prior Publication Data

US 2007/0266059 A1 Nov. 15, 2007

(51) Int. Cl.
*G06F 7/00* (2006.01)
*G06F 17/00* (2006.01)
(52) U.S. Cl. .................. 707/655; 707/657; 707/659
(58) Field of Classification Search .................. 707/655, 707/657, 659
See application file for complete search history.

(56) References Cited

U.S. PATENT DOCUMENTS 6,108,748 A 8/2000 Ofek et al.
(Continued)

OTHER PUBLICATIONS

Kubiatoxicz, OceanStore: An Architecture for Global-Scale Persistent Storage, ACM 2000, pp. 190-201, in view of Ofek, US Patent No. 6,578,134.*

*Primary Examiner* — John R. Cottingham
*Assistant Examiner* — Mariela Reyes
(74) *Attorney, Agent, or Firm* — Mattingly & Malur, P.C.

(57) ABSTRACT

Data is migrated from a first CAS (contents addressed storage) system to a second CAS system. When the migration process is started, the second CAS system retrieves a list of the objects stored on the first CAS system. The second CAS system, based on the list, retrieves each object from the first CAS system, calculates an object ID for each object, and stores each object and the calculated object ID into the storage devices in the second CAS system. Methods for reducing downtime during the migration process are also disclosed.

10 Claims, 11 Drawing Sheets

U.S. PATENT DOCUMENTS

| | | | |
|---|---|---|---|
| 6,145,066 A * | 11/2000 | Atkin | 711/165 |
| 6,598,134 B2 * | 7/2003 | Ofek et al. | 711/162 |
| 7,281,107 B2 * | 10/2007 | Iitsuka | 711/165 |
| 2005/0125625 A1 | 6/2005 | Kilian et al. | |

* cited by examiner

| Object ID | Disk location1 | Disk location2 |
|---|---|---|
| FVHLQCT1TFJ62X4ULSLQF9 | 0x00001000 | 0x00000000 |
| CSTESF15DA23LQCT1TFJ62 | 0x00010020 | 0x00000100 |
| X4ULSL2ME43FETTEQP292Y | 0x00020000 | 0x00000200 |
| CSTESET314Z43FETTEQP2L | 0x00020000 | 0x00000300 |
| ... | ... | ... |
|  |  |  |

SYSTEM AND METHOD FOR REPLACING CONTENTS ADDRESSABLE STORAGE

BACKGROUND OF THE INVENTION

1. Field of the Invention

The present invention relates generally to storage systems, and, in particular, to storage systems composed of a plurality of contents addressable storage (CAS) systems

2. Description of Related Art

Of the number of different known methods for archiving data, each method has certain disadvantages. Until recently, archiving with tape has been the most commonly-used method for archiving data, but tape archives are often difficult to access and do not allow quick and easy retrieval of archived data. Because of this, disk arrays have become more common as the archival medium of choice, since they allow archived data to be more quickly and easily accessed. However, prior art disk array archiving schemes suffer from several limitations, such as users being unable to locate the correct file and the storage of a large amounts of duplicate data, leading to increased costs for archiving.

Fixed Content Aware Storage, Content Addressed Storage

Fixed Content Aware Storage (FCAS) is generally defined by SNIA (Storage Networking Industry Association) as storage of unchanging data (fixed content) and associated metadata based on a variety of naming schemas including Content Addressed Storage (CAS) and global content-independent identifiers. In the storage industry, CAS is also sometimes referred to as Content Addressable Storage, Content Aware Storage or Content Archive Storage.

In CAS, users and host computers store and retrieve data as an object, composed of content and metadata, rather than treating data as a standard file. The data (content) is appended with metadata (attributes of the content) and is assigned a unique object designator known as a "content address" or "object ID". For archiving, the object is stored to a permanent location on a hard disk. Since each object is unique, multiple copies of the same file are not stored. This reduces the storage of duplicate data and reduces the total storage requirements, thereby overcoming a major limitation of disk array archiving discussed above.

In a CAS object, the content is a byte stream and the metadata is the additional information regarding attributes of the content, such as creation time, retention period, size of the content, comments regarding the content, and the like. By attaching a detailed and well-thought-out metadata to the object, data may be indexed, classified or searched without knowing specific filenames, dates or other traditional file designations. Thus, enhanced metadata may include background information, comments, and other information on the data that can aid someone who accesses the data in the future in understanding or applying the data, and that can also aid in searching for and locating desired data.

When an object is stored to CAS, the CAS system generates identification information (object ID or object identifier), and then the object ID is returned to hosts/users. Hosts/users are able to access objects using the object ID. In some implementations of CAS, the object ID is generated using a kind of hash algorithm such as SHA-1 (Secure Hash Algorithm), SHA-256, or MD-5 (Message Digest 5). But at the moment, neither the method for generating the object ID nor the access protocol has yet been standardized. Therefore to enable object access in CAS, host computers use what ever API (Application Programming Interface) is provided by the vendors of the particular CAS system that the user has purchased.

CAS also enables data reduction by locating commonality among data and by eliminating duplication of stored data. When data is stored to the CAS system, a hash algorithm is applied to the data, which produces a unique value according to the content. The CAS system compares that unique value against an index of unique values of other saved objects. If the unique hash value is not in the index, then the data and its metadata are stored and the hash value is added to the index. However, if the hash value is already in the index, then that data has already been stored, and only the metadata and a pointer to the already stored data are stored. This can result in substantial savings of archival storage space. Additionally, in many applications, less expensive SATA hard disks may be used in CAS systems, rather than more expensive Fibre Channel disks, which can result in additional cost savings. US Patent Application Publication No. US 20050125625 to Kilian et al., which is incorporated by reference herein in its entirety, discusses one application of CAS for parsing a content address to facilitate selection of a physical storage location in a data storage system. This application discloses a method for data placement in a CAS storage system, but fails to teach or suggest any method for the migration of data from one CAS storage system to another.

Data Migration between Storage Systems

Because the lifetime of data is generally longer than that of the storage apparatus on which it is stored, there sometimes arises the need to migrate data from a current storage system to a new replacement storage system. During data migration, one important concern is to shorten any downtime required during the migration. U.S. Pat. No. 6,108,748 to Ofek et al. discloses one method for migrating data in storage systems while a host computer is online. Ofek et al. disclose a data migration method that is applicable to a mainframe storage system or a block access storage system, in which the same access method is applicable to both the donor storage device (storage system to be migrated) and the donee storage device (newly installed storage system). However, as the method described in this disclosure is directed to data migration between CAS systems, in which the data access methods are different from each other, the technique disclosed by Ofek et al. cannot be used.

Migrating Data between CAS Systems

When migrating data between CAS systems, it is likely that the object ID information will be changed, and, accordingly, current data migration methods that are applicable to block-based storage systems cannot be used. Since there is no industry standard for CAS systems, when moving data between an old CAS system sold by one vendor and a new CAS system sold by a different vendor, the object ID (content address) of each object will be different in the new system than it was in the old system. This is because the access method and the object ID generating method will be different. For example, one vendor may use one or more first hash algorithms for creating the object IDs, while another vendor might use different hash algorithms. Furthermore, even if both CAS systems were manufactured by the same vendor, the method of generating object IDs might be different when the new CAS system is upgraded. Therefore in CAS data migration, another method is required for transferring data between a first CAS system having one data access method or object ID calculation scheme and a second CAS system having a different data access method and object ID calculation scheme.

BRIEF SUMMARY OF THE INVENTION

Under the present invention, a donor first CAS system, a donee second CAS system, and at least one host computer are provided. When the migration is started, the second CAS system retrieves the list of the objects (index) from the first CAS system that are stored in the first CAS system. The second CAS system, based on the list, retrieves each object from the first CAS system, calculates a new object ID of each object, and stores each object and calculated object ID into the storage device in the second CAS system. After the process finishes, the second CAS system sends the information to the host computer that records the mapping between the object ID of each object that was previously assigned by the first CAS system and the object ID of each object that is newly assigned by the second CAS system.

These and other features and advantages of the present invention will become apparent to those of ordinary skill in the art in view of the following detailed description of the preferred embodiments.

BRIEF DESCRIPTION OF THE DRAWINGS

The accompanying drawings, in conjunction with the general description given above, and the detailed description of the preferred embodiments given below, serve to illustrate and explain the principles of the preferred embodiments of the best mode of the invention presently contemplated.

DETAILED DESCRIPTION OF THE INVENTION

Figure 1:
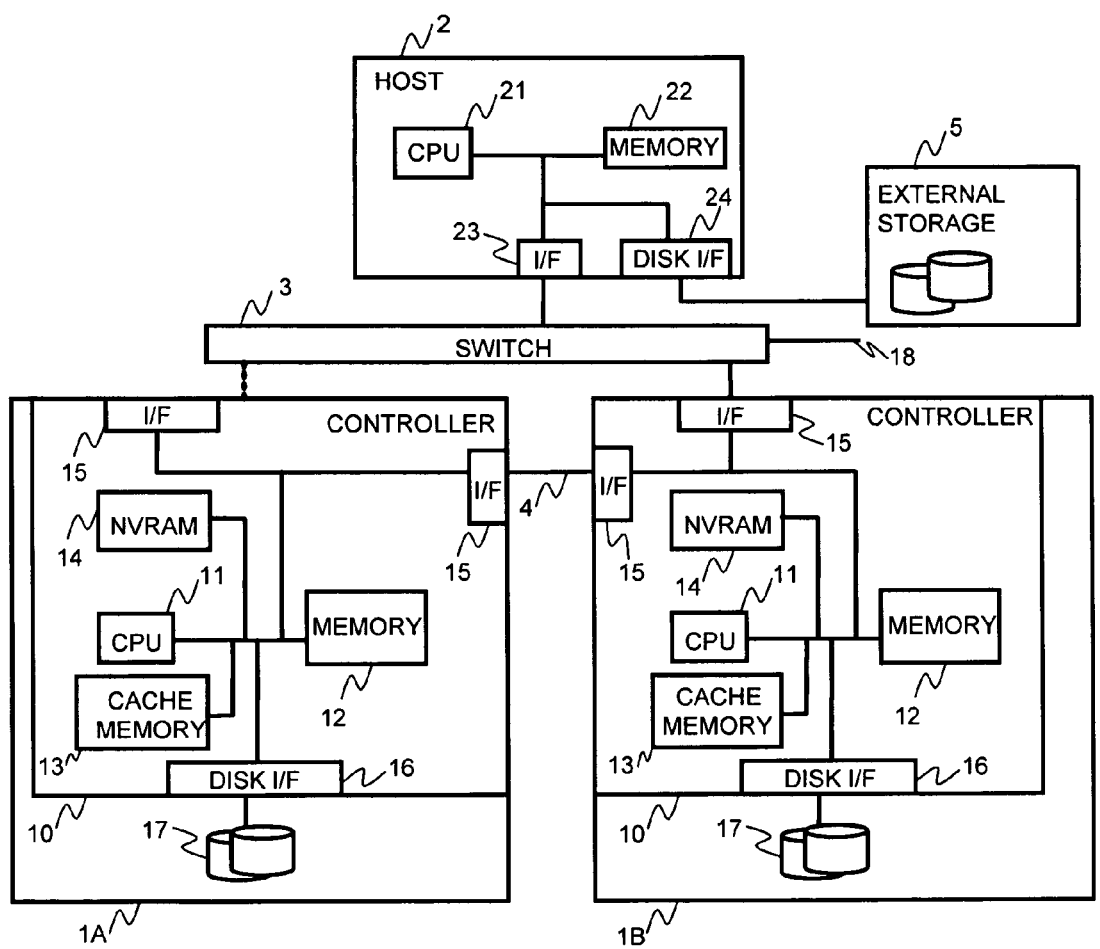
FIG. 1 illustrates an example of an apparatus and system configuration in which the invention may be applied.

In the following detailed description of the invention, reference is made to the accompanying drawings which form a part of the disclosure, and, in which are shown by way of illustration, and not of limitation, specific embodiments by which the invention may be practiced. In the drawings, like numerals describe substantially similar components throughout the several views. Further, the drawings, the foregoing discussion, and following description are exemplary and explanatory only, and are not intended to limit the scope of the invention or this application in any fashion.

First Embodiment—System Configuration

FIG. 1 illustrates an example of an apparatus and system configuration in which the invention may be applied. The system includes a donor storage system 1a, donee storage system 1b, and at least one host 2.

Donor storage system 1a is a CAS system containing data to be migrated to donee storage system 1b, which is also a CAS system. In this embodiment, donor storage system 1a contains data in a first type of CAS object format calculation scheme and data access method. Under the invention, this data is migrated to donee storage system 1b, which stores data in a second type of CAS object format calculation scheme and data access method. The most common reason for migrating the data from donor system 1a to donee system 1b is when the donor system 1a is being replaced with the donee system 1b, although migration might also be carried out to create a copy of the data from the donor system or for other reasons. Donor system 1a and donee system 1b in this embodiment are assumed to contain similar hardware components, and accordingly, the following description of applies to both systems in this embodiment. Although, it should be noted that in alternative embodiments the donee storage system 1b may be composed of some hardware elements that differ from those of the donor storage system 1a.

Each storage system 1a, 1b includes a disk controller 10 and at least one storage device 17, such as hard disk drives. Disk controller 10 may include a CPU 11, a memory 12, a cache memory 13, a NVRAM (nonvolatile random access memory) 14, one or more network interfaces (I/Fs) 15 and a disk I/F 16, each of which is described in more detail below.

CPU 11 executes software programs for processing host I/O (input/output) requests, for storing and retrieving data in the storage devices 17, and the like. The software programs executed by CPU 11 under the invention are described in greater detail below.

Memory 12 is used to store the software programs that are executed in the CPU 11, and is used to store the information that is necessary to process and manage the data in the storage devices 17. Cache memory 13 is used to temporally store data that is read to or written from host 2, and for caching the data to shorten the response time of host 2. Cache memory 13 may be of the type that includes a battery back-up to preserve data even if the storage system power supply fails. Further, during startup of the storage system, the programs that are executed in the CPU 11 are stored in the NVRAM 14. When the storage system 1a, 1b starts booting, the programs in the NVRAM 14 are loaded into memory 12 and are executed by CPU 11.

Network I/Fs 15 may be used to connect the storage systems 1a, 1b to a network 18 via a network switch 3, and thereby enable communication of the storage systems with host 2. Network I/Fs 15 may also be used to enable donor storage system 1a to communicate directly with donee storage system 1b, as will be discussed in greater detail below. In the present embodiment, the network I/F 15 may be an Ethernet interface network interface controller (NIC), although other interface types may also be used with alternative network protocols.

Disk I/F 16 connects controller 10 to the one or more storage devices 17. In the present embodiment, the disk I/F 16 is a Fibre Channel (FC) interface, and the storage devices 17 are FC disk devices that are accessed by the disk controller 10 in accordance with Fibre Channel protocol. In an alternative implementation, the disk I/F 16 may be an ATA interface. In this case, the storage devices 17 that are connected to the disk I/F 16 may be S-ATA (Serial ATA) type disk devices that are accessed by the disk controller 10 in accordance with the serial ATA protocol. Yet still alternatively, in another implementation, the storage devices 17 may be NAS (Network Attached Storage) devices that are accessed with NFS (Network File System) or CIFS (Common Internet File System) protocol. In this case, the disk I/F 16 is an Ethernet interface.

Host computer 2 (hereinafter called "host 2") may be a typical PC/AT compatible computer or workstation running a UNIX® or Windows® operating system. In another embodiment, host 2 may be a mainframe computer running an operating system such as OS/390® or z/OS®. Host 2 includes at least a CPU 21, a memory 22, a disk I/F 24 and a network I/F 23, such as a network interface controller (NIC) to enable connection to network switch 3, and thereby to enable communication with the donor storage system 1a and the donee storage system 1b via network 18. Host computer 2 is able to store and access data in the donor storage system 1a and communicates with the donor storage system 1a via network 18 and switch 3. When the data in the donor storage system 1a is moved to the donee storage system 1b, host 2 is connected for communication with the donee storage system 1b. Further, host 2 may also be connected to its own external storage 5, such as in the case in which external storage 5 is used as active storage, while storage systems 1a, 1b are only used for archiving of data.

Network switch 3 may be a LAN (local area network) switch, and is a part of network 18 that may be a LAN that enables communication between the donor storage system 1a, donee storage system 1b, and at least one host 2. In the present embodiment, network 18 is composed of at least one LAN switch 3, which may be an Ethernet switch. Initially, only donor storage system 1a and host 2 are interconnected via network 18 through switch 3. When the donee storage system 1b is installed, the donee storage system 1b is connected to the LAN switch 3. The physical interface of switch 3 is Ethernet in this embodiment.

Additionally, when donee storage system 1b is installed, a data link 4 may be used to connect donor storage system 1a and donee storage system 1b each other. In this manner, when data migration occurs, the data migrated to the donee storage system 1b can be transmitted via the data link 4 rather than through network 18. The physical network I/Fs 15 used for data link 4 are the same as those used to connect to LAN switch 3. In another embodiment, it is possible that the data link 4 may not exist and that the data to be migrated to the donee storage system 1b is transmitted via LAN switch 3.

Functional Diagram

Figure 2:
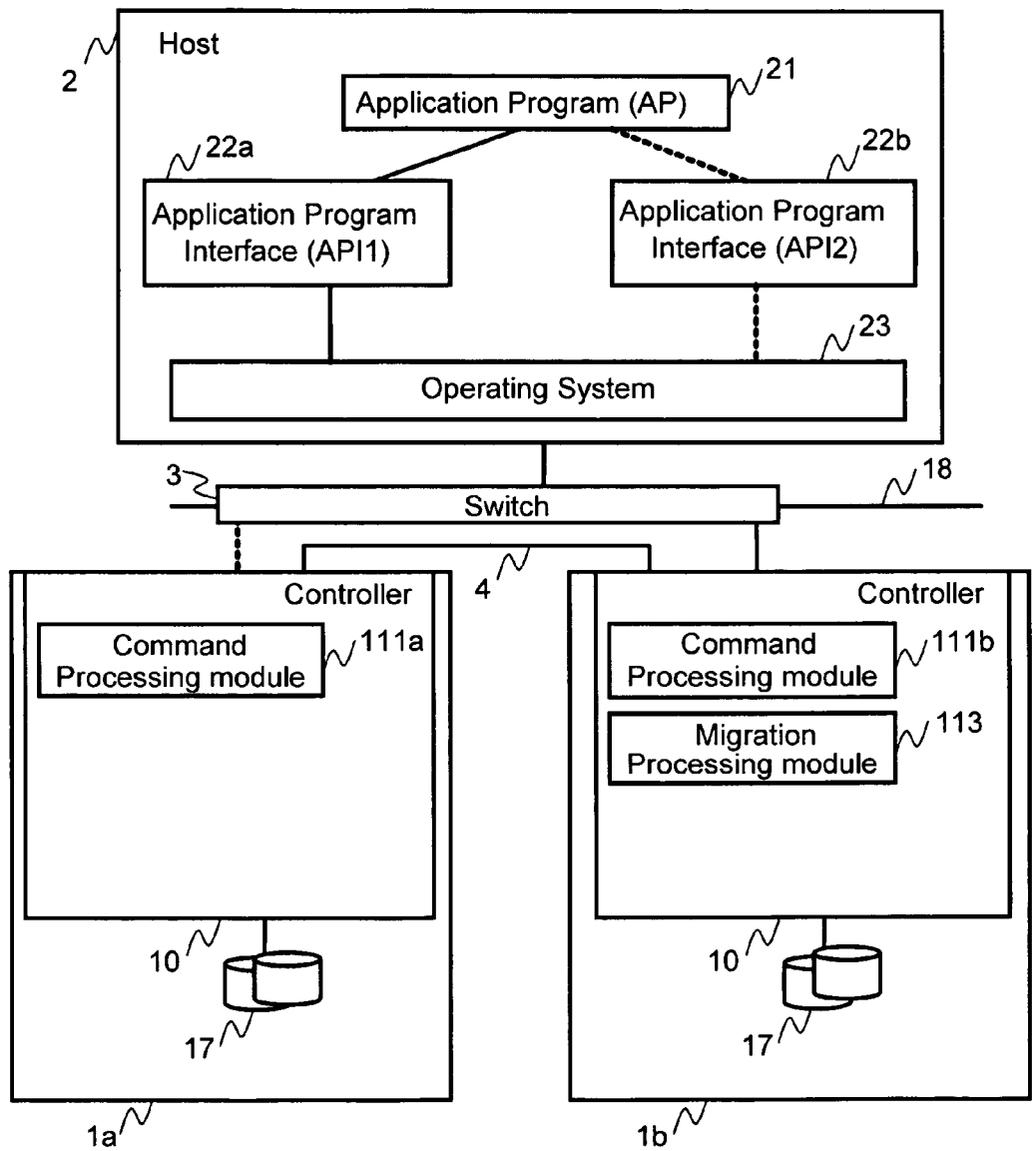
FIG. 2 illustrates a functional diagram of the configuration of FIG. 1.

FIG. 2 illustrates a functional diagram of the donor storage system 1a, the donee storage system 1b, and host 2. Donor storage system 1a includes a command processing module 111a for processing access requests made from host 2 via a first application interface program (API1) 22a running on host 2. Command processing module 111a determines the location of data in the storage devices 17 with respect to the data that is received from host 2. In the present embodiment, since the storage devices 17 are Fibre Channel storage devices, command processing module 111a manages the logical block addresses of storage devices 17 for storing each block of data.

Donee storage system 1b includes a command processing module 111b, that is similar to command processing module 111a. Command processing module 111b processes access requests made from a second application program interface (API2) 22b running on host 2, and stores the data into storage devices 17 in the donee storage system 1b.

Migration processing module 113 is also included on donee storage system 1b, and is used to migrate data from the donor storage system 1a to the donee storage system 1b in accordance with the present invention, as will be discussed in greater detail below. Migration processing module 113 is preferably embodied as software stored in memory 12, or other computer readable medium located at storage system 1b or remotely, and executed by CPU 11 on donor storage system 1b.

Application program (AP) 21 on host 2 is a program that accesses donor storage system 1a or donee storage system 1b. When AP 21 accesses the donor storage system 1a or the donee storage system 1b, this takes place via API1 (22a) or API2 (22b).

First application programming interface (API1) 22a is used by AP 21 to access data in the donor storage system 1a. API1 22a includes a programming library, and is generally provided along with the donor storage system 1a by the vendor of donor storage system 1a. Similarly, second application programming interface (API2) 22b is used by the AP 21 to access data in the donee storage system 1b. API2 22b includes a programming library, and is generally provided with the donee storage system 1b by the vendor of donee storage system 1b.

An operating system 23 is also located on host 2, and provides the basic infrastructure to enable AP 21, API1 22a, or API2 22b to be executed. In an alternative implementation, API1 22a and/or API2 22b may be implemented as part of the operating system 23. Before the donee storage system 1b is installed, API2 22b does not reside on host 2, but AP 21, API1 22a, and operating system 23 are installed in the host 2. When the donee storage system 1b is installed in the system, API2 22b is also installed on the host 2. The functions and interactions of these programs as discussed in more detail below.

Object/Content

Figures 3, 4:
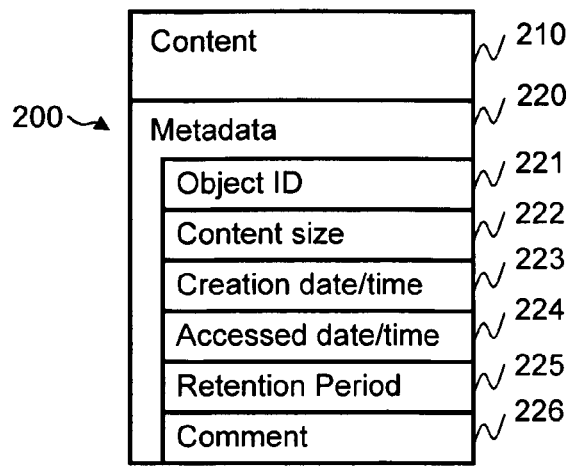
FIG. 3 illustrates an example of an object data structure that is stored in a CAS system.
FIG. 4 illustrates an object management table maintained by the donor storage system.

FIG. 3 shows an example of an object data structure that is stored in a CAS system (donor storage system 1a or donee storage system 1b), although additional or different metadata may also be included depending on a particular implementation. The data structure is called object 200 in the embodiment illustrated. Object 200 consists of content 210 and metadata 220. Content 210 is the data that AP 21 writes through API1 22a or API2 22b, and the metadata 220 is the attribute information of the content 210. The following are examples of the information that is included in the metadata 220.

Object ID 221: This field contains a unique identification number of each content. Before the CAS system (donor storage system 1a or donee storage system 1b) stores an object 200, it calculates and assigns the object ID 221 to the object 200 that is unique within the CAS system. The object ID 221 is generated or calculated from the content 210, and so long as the content is unique in the system, then the object ID 221 will also be unique. To generate the object ID 221, a hash algorithm such as SHA-1 or MD5 is used in the preferred embodiment, although other methods may also be used.

Content size 222: This field shows the size of the content 210.

Creation date/time 223: This field is used to store the date/time at which the object 200 is first stored in the CAS system.

Accessed date/time 224: This field is used to store the date and time when the object 200 was last accessed (read or written) in the CAS system.

Retention period 225: In the present embodiment, a user can set the object 200 to a write-protected state for a certain period of time. When the user sets the object to the write-protected state, the user may also specify how long the object should remain write-protected. The time is called the "retention period", and is stored in this field. When the user does not set the object into the write-protected state, then a NULL value is set as the retention period 225.

Comment 226: A comment, or multiple comments may be added by the user in each object 200 via API1 22a or API2 22b. The comment 226 is stored in the comment field, and may be used to aid in indexing or searching for the object, to provide contextual information, or for other purposes, depending on the type of data and the particular implementation.

Application Programming Interface

When the CAS system (donor storage system 1a or donee storage system 1b) is accessed from host 2, each of the command processing modules 111a and 111b receives a command from the application programming interface 22a and 22b, respectively. The commands which are exchanged between the command processing module 111a and the first application programming interface API1 22a or between the command processing module 111b and the second application programming interface API2 22b are generally proprietary commands defined by the vendors of the donor storage system 1a or the donee storage system 1b. In another embodiment, the commands may be defined based on standard (or de facto standard) I/O protocols such as NFS or http.

In the present embodiment, each of API1 22a and API 22b is provided in the form of the C-Programming library, which includes a set of C-Programming functions. AP 21 is linked with one of API 22a and API2 22b when AP 21 is executed. That is, AP 21 is programmed so that AP 21 calls the functions defined in API1 22a or API2 22b. When AP 21 reads or writes data in the CAS system, the functions defined in the API1 22a or API2 22b are called. The following is a brief description of the common functions typically defined in API1 22a or API2 22b.

Create_object( ): This function is used to create and store an object in the CAS system. When using the create object function, AP 21 designates the content information, and when necessary, it passes additional comment information via API1 22a or API2 22b. The CAS system, in response, creates the object and returns to AP 21 the object ID information.

Read_object( ): This function is used to retrieve an object from CAS system. When using this function, AP 21 designates the object ID, and in response, the CAS system returns the object content and metadata to the host.

Write_object( ): This function is used to update an object that already currently resides in the CAS system.

Set_Retention( ): This function is used to set the retention period 225 of the designated object, though the retention period 225 can only be modified when no date information is set in the retention period 225 or when the retention period is expired. When using this function, AP 21 designates the object ID.

Modify_attribute( ): This function is used to modify the information in the metadata 220. Not all information can be modified by the function. In the present embodiment, the only information that can be modified by this function is the comment 226 and retention period 225, though the retention period 225 can only be modified when no date information is set in the retention period 225 or when the retention period is expired. In the present embodiment, users can use either of the Set_Retention function and the Modify_attribute function when the retention period is set/changed. In another embodiment, the Set_Retention function may not be supported in API1 22a or API2 22b, that is, only the Modify_attribute function may exist to set/change the retention period 225.

List_object( ): This command is used to retrieve all object IDs for objects that are currently stored in the CAS system.

Query( ): This command is used to retrieve the list of object IDs that match a specified condition. When using this function, AP 21 can specify one or more conditions. For example, when the user wants to retrieve a list of object IDs that were created for a certain period of time, AP 21 issues the query function by designating the creation data/time information 223. The CAS system then returns the object IDs of the objects that were created during the designated time period.

List_mapping( ): In accordance with the present invention, this command is used to retrieve object mapping information 700 (discussed in detail below with reference to FIG. 6) when the migration of data from the donor storage system 1a to the donee storage system 1b has taken place. This function does not have to be supported by the donor storage system 1a and API1 22a, but the donee storage system 1b and API2 22b should support the function.

Object Management in CAS

FIG. 4 illustrates an object management table 500 that is maintained by donor storage system 1a. The object management table 500 is stored in cache memory 13 of donor storage system 1a in the present embodiment. In another embodiment, object management table 500 may be stored in storage devices 17. The object management table 500 is used to record the location information of each object 200, and contains the following fields:

Object ID 501: This field contains the object ID information of all objects 200 that the donor storage system 1a currently maintains.

Disk location1 502: In this field, the location information of the content 210 is stored that the object ID 501 specifies. In the present embodiment, the location information is stored as a LBA (logical block address) within the storage devices 17. In another embodiment, when the storage devices 17 are NAS devices, the location information can be file name information.

Disk location2 503: This field contains the location information of the metadata that is specified with the object ID 501 and is also stored as a LBA. In the present embodiment, content 210 and metadata 220 are not necessarily stored in locations adjacent to each other in the donor storage system a. Therefore, the donor storage system la maintains the disk locations of both the content 210 and the metadata 220 separately.

Figure 5:
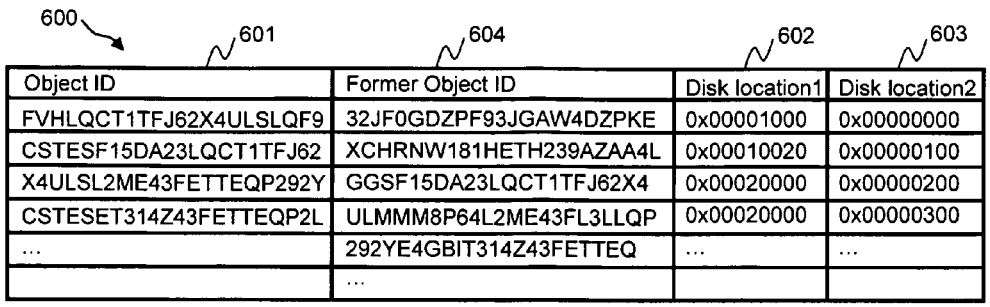
FIG. 5 illustrates the object management table that is maintained by the donee storage system.

FIG. 5 illustrates the object management table 600 that donee storage system 1b maintains. The elements in the donee object management table 600 are similar to the donor object management table 500. Thus, the donee object management table 600 is stored in the cache memory 13 in the donee storage system 1b. But in another embodiment, donee object management table 600 may be stored in a storage device 17 in the donee storage system 1b. Donee object management table 600 includes the following fields:

Object ID 601: Similar to object ID 501 discussed above, this field contains the unique object IDs of all objects 200 that the donee storage system 1b currently maintains.

Disk location1 602: Similar to disk location1 502 discussed above, this field contains the location information where the content 210 of each object in the donee storage system 1b is stored.

Disk location2 603: Similar to disk location2 503 discussed above, this fields contains the location information where each metadata 220 of each object in the donee storage system 1b is stored.

Former object ID 604: This field is used for the objects migrated from the donor storage system 1a. When the donee storage system 1b copies an object from the donor storage system 1a, the object ID information that the donor storage system 1a has assigned to the object is stored in the former object ID 604 field. Details of how the information in the former object ID 604 field is used will be described later.

Figure 6:
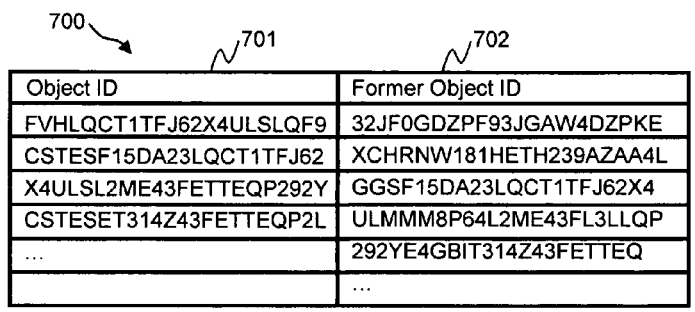
FIG. 6 illustrates an example of the object mapping information.

Further, FIG. 6 illustrates the mapping information 700 that provides the mapping between the new object ID 701 in the donee system 1b and the former object ID 702 in the donor system 1a. Thus, mapping information 700 includes an object ID 701 field that corresponds to object ID 601 field discussed above, and a former object ID 702 field that corresponds to the former object ID 604 field discussed above. The mapping information 700 is delivered to the user or host, as is discussed in more detail below with reference to step 1007 of FIG. 8.

Contents Management by Application

Figure 7:
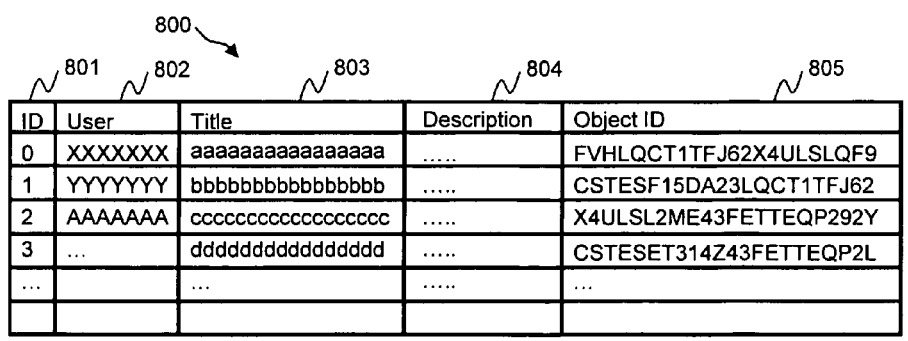
FIG. 7 illustrates an example of the database table maintained by the application program.

In the present embodiment, AP 21 is a relational database (RDB) and stores the data in the external storage system 5, in addition to the donor storage system 1a or donee storage system 1b. FIG. 7 illustrates an example of a database table 800 that AP 21 stores into the external storage system 5. Columns 801 through 805 are the attributes of the table 800, such as an ID 801 for an entry, a user 802, a title 803, a description 804, and in column 805 are stored the object IDs maintained by AP 21. Under one embodiment, table 800 is stored in external storage system 5, while the objects listed in table 800 are stored in the donor storage system 1a (prior to migration). AP 21 retrieves or stores the information stored in the database table 800 in accordance with the users' requests. When the objects in the CAS system need to be retrieved, AP21 retrieves the specified object using the object ID 805. When objects need to be stored, AP 21 stores the objects using API1 22a (before migration) or API2 22b (after migration). Further, since the object ID is returned from the CAS system when the object is created, AP 21 stores the received object ID information into the database table 800.

Migration Process

Figure 8:
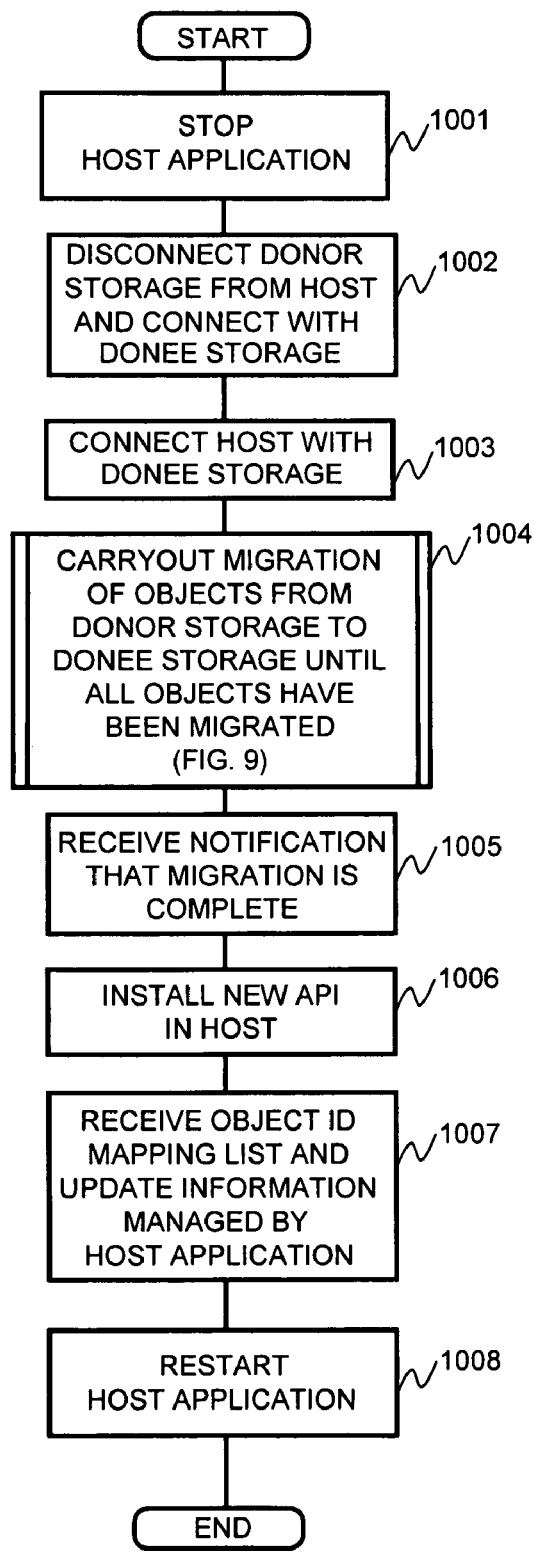
FIG. 8 illustrates an overview of the migration operation.

FIG. 8 illustrates an overview process flow of the migration operation under the first embodiment of the present invention. The process includes the following steps:

Step 1001: Initially, a user or host 2 stops the execution of the application program 21 to prevent write attempts during migration which could result in lost data.

Step 1002: The user disconnects the donor storage system 1a from network 18, and connects the donor storage system 1a to the donee storage system 1b. The disconnection process can be done by physically removing the cable that resides between the donor storage system 1a and network 18 so that donor storage system 1a is no longer in communication with host 2. In another embodiment, the disconnection can be done logically, by changing the network configuration, such as by the user changing the IP address assigned to the donor storage system 1a.

Step 1003: The user puts the donee storage system 1b into communication with host 2. The connection process may be done by physically attaching a cable between the donee storage system 1b and network 18, and when needed, the user may have to set the IP address of the donee storage system 1b as the same IP address that was assigned to the donor storage system 1a. In another embodiment, the connection can be done by logically changing the network configuration, such as IP addresses. Additionally, if data link 4 is to be used, that connection is made at this time. After connecting the donee storage system 1b, the user is ready to start the migration process.

Step 1004: Migration is carried out in the donee storage system 1b, as will be described in more detail below with reference to FIG. 9.

Step 1005: The user or host 2 receives notification from the donee storage system 1b that the migration process is complete.

Step 1006: The user installs new API2 22b in the host 2. In some cases, AP 21 may be uninstalled and the user may have to also install a new application program (not shown in FIG. 2) or a modified version of AP 21 which is particularly configured for accessing the donee storage system 1b using API2 22b.

Step 1007: The user or host 2 receives the object mapping information 700 from the donee storage system 1b. Based on the mapping information, the contents management information 800 is updated so that each object in the donee storage system 1b may be accessed using the new object ID 805 that is assigned by the donee storage system 1b. The object mapping information 700 that the user receives from the donee storage system 1b specifies what object ID is assigned for each object migrated from the donor storage system 1a to the donee storage system 1b. As discussed above, FIG. 6 shows an example of the object mapping information 700, including a list of object IDs 701 which are assigned to each object by the donee storage system 1b, and a list of former object IDs 702 that were previously assigned to the objects when the objects resided in the donor storage system 1a. Alternatively, the donee storage system 1b can maintain object management table 600, and use this information for responding to future read requests from host 2, rather than requiring host 2 to update contents management information table 800.

Step 1008: After step 1007 is completed, the user restarts AP 21 and the process ends. After the process is completed, the user may remove the donor storage system 1a from the system.

Figure 9:
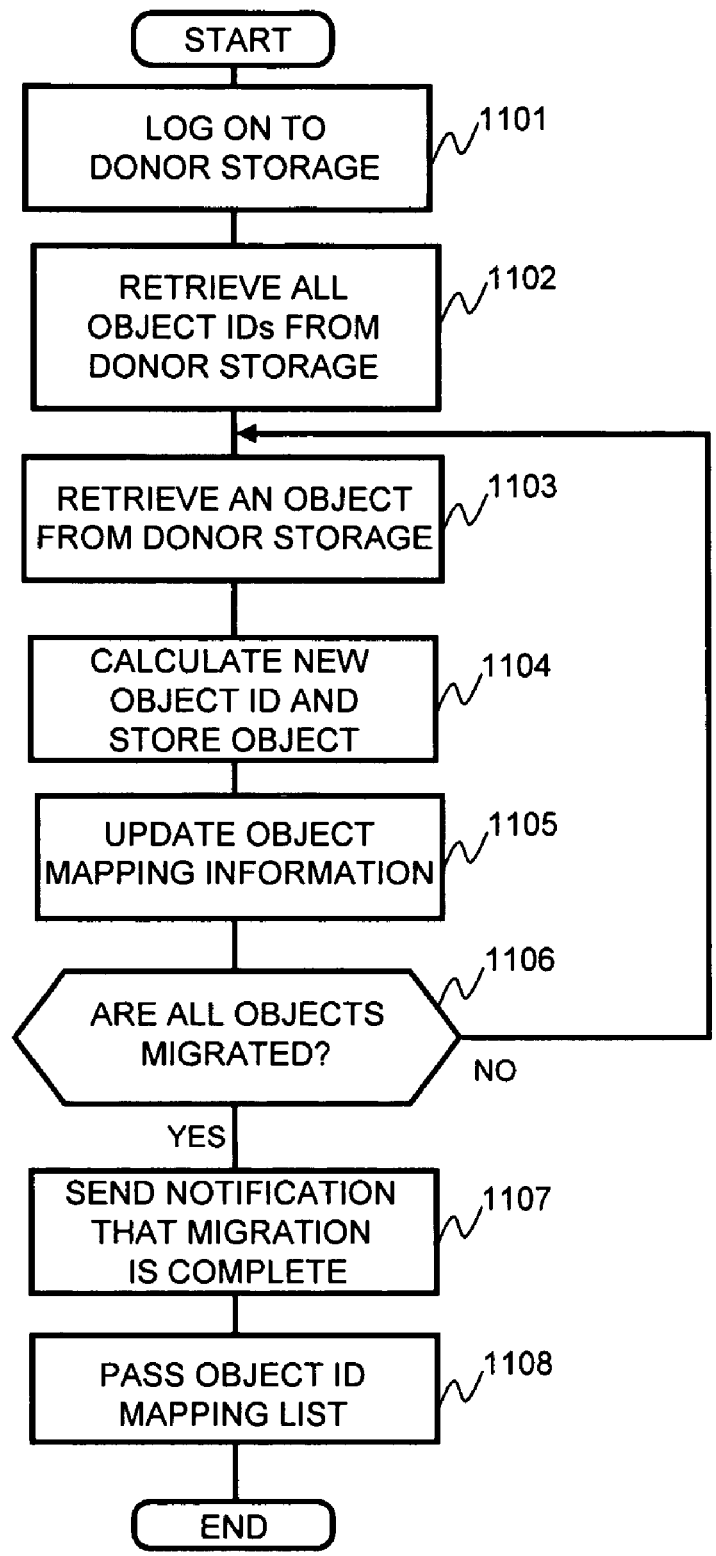
FIG. 9 illustrates a process flow of the migration operation that is executed in the donee storage system.

FIG. 9 illustrates a process flow of the migration operation that is executed in the donee storage system 1b. The migration process illustrated in FIG. 9 includes the following steps:

Step 1101: The migration processing module 113 in the donee storage system 1b prepares to access the donor storage system 1a. In the present embodiment, it is assumed that the donor storage system 1a has an authentication function when host 2 or the donee storage system 1b attempts to access objects. Therefore the donee storage system 1b logs on to the donor storage system 1a and executes the authentication process. The authentication information such as a password is setup in the donee storage system 1b by the user.

Step 1102: After step 1101, the migration processing module 113 retrieves the list of object IDs from the donor storage system 1a of all objects that are currently stored on the donor storage system 1a. To retrieve the list of object IDs, the migration processing module 113 issues a List_object( ) or a Query( ) function to the donor storage system 1a. Thus, the migration module 113 may include the same (or a similar) functions equal to the List_object( ) or Query( ) functions discussed above for API1 22a.

Step 1103: Based on the list of the object IDs, the migration processing module 113 retrieves an object from the donor storage system 1a. Thus, in the present embodiment where the content and metadata are stored in separate locations, the content is retrieved and also the metadata for that content.

Step 1104: The migration processing module 113 calculates a new object ID according to the content of the object that was retrieved at step 1103, such as by hashing algorithms, and configures new metadata for the object according to parameters existing in the retrieved metadata and any new parameters, such as additional comments, that may have been established for the donee storage system 1b. The migration processing module 113 stores the object content and metadata including the new object ID for each object into the storage devices 17.

Step 1105: The migration processing module 113 updates the mapping information 700 with the new object ID and also updates the object management table 600 for managing the locations where the content and metadata of each newly-created object are stored. As discussed previously, for each object, the content and the metadata may be stored in separate locations or adjacently.

Step 1106: The migration processing module 113 checks whether all objects that are listed in the list of the object IDs obtained at step 1102 have been migrated. If all objects have been migrated, the process proceeds to step 1106. If not, the process goes back to step 1103.

Step 1107: Once all objects have been migrated from donor storage system 1a to donee storage system 1b, the migration processing module 113 notifies the host 2 that the migration is complete. In another embodiment, there exists a management console (not show in the drawings), and the migration completion message is displayed for the user on the GUI screen of the management console.

Step 1108: Migration processing module 113 passes the object mapping information 700 to host 2. In another embodiment, the mapping information is sent to the management console. Based on the object mapping information 700, the user or AP 21 updates the contents management information 800.

Second Embodiment

Figure 10:
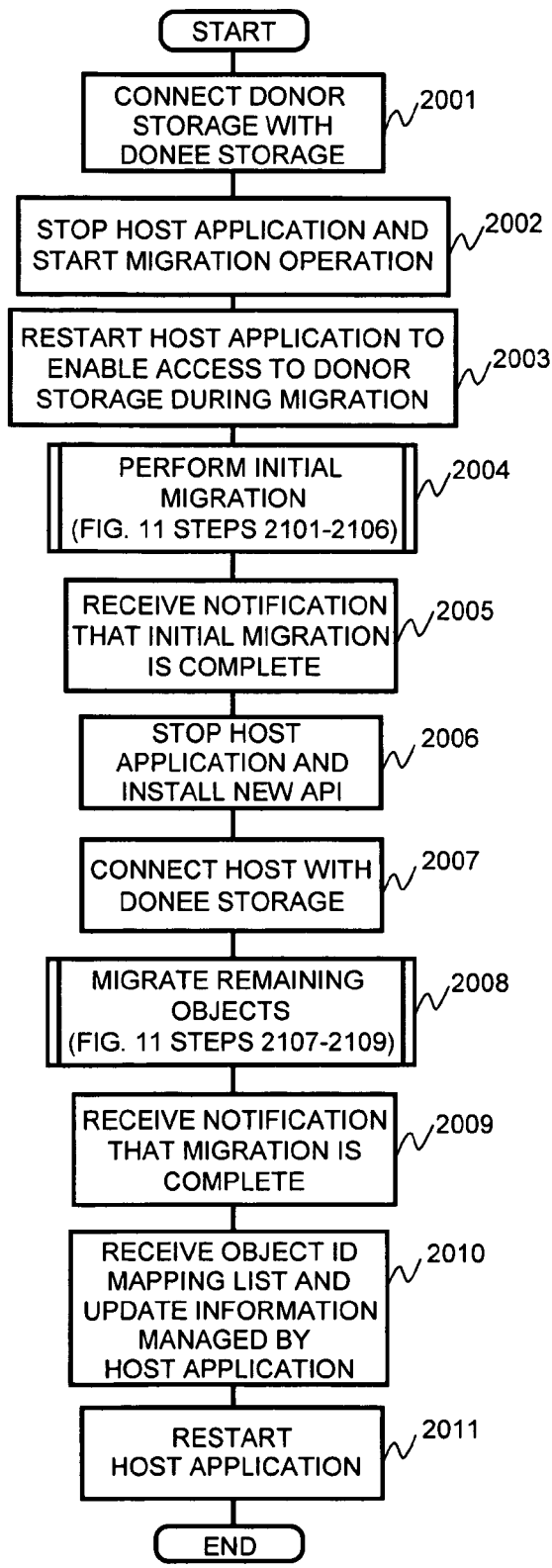
FIG. 10 illustrates an overview of the migration operation in the second embodiment.

In the first embodiment, the host application (AP 21) must be stopped (steps 1001-1008 of FIG. 8) until all objects have been migrated to the donee storage system 1b. When the amount of data to be migrated is large, a long downtime can occur, which may be undesirable in many industries. The method set forth in the second embodiment makes the downtime shorter than that of the first embodiment. The second embodiment is useful in systems in which the host does not update or overwrite objects once they have been written to the donor storage system 1a, such as in the case of a WORM (write once, read many) system. In this situation, the host may continue to write new objects to the donor storage 1a, while the existing objects are migrated to the donee storage. Once the existing objects are migrated, the donee storage is connected to the host and the remaining objects that were created while the initial migration was taking place are then migrated to the donee storage 1b. FIG. 10 illustrates an overview of the migration operation according to the second embodiment, and includes the following steps:

Step 2001: The user connects the donor storage system 1a with the donee storage system 1b. The connection process can be done by physically connecting the cable for data link 4 between the donor and donee storage systems 1a and 1b, or via network 18. At this point, the donee storage system 1b is not connected to host 2.

Step 2002: The user stops AP 21, and starts migration of data from the donor storage system 1a to the donee storage system 1b by initializing migration processing module 113.

Step 2003: The user restarts AP 21, so that AP 21 continues to be able to access donor storage system 1a as before.

Step 2004: An initial migration process is carried out by the donee storage system 1b, as will be described in more detail below with reference to steps 2101-2106 of FIG. 11.

Step 2005: The user checks if the migration between the donor storage system 1a and the donee storage system 1b has completed, or waits until notification of completion of initial migration is received. When the initial migration has completed, the process proceeds to step 2006.

Step 2006: Once the initial migration has completed, the user stops AP 21 again and installs new API2 22b in the host 2. In some cases, AP 21 may also have to be uninstalled from host 2, and the user may have to install a new application program or a modified version of AP 21 which is specifically configured for accessing the donee storage system 1b using API2 22b.

Step 2007: The user disconnects the donor storage system 1a from communication with host 2, and connects the donee storage system 1b into communication with host 2. The connection process is done by physically attaching the cable between the donee storage system 1b and network 18, and when needed, the user may have to set the IP address of the donee storage system 1b into the same IP address that was previously assigned to the donor storage system 1a. In another embodiment, the connection can be done by changing the network configuration such as by logically changing the IP address. The connection between donor storage system 1a and donee storage system 1b also remains intact.

Step 2008: The donee storage system 1b starts copying the remaining objects by carrying out steps 2108-2112 in FIG. 11. The remaining objects are the objects which were newly created by host 2 (AP 21) in the donor storage system 1a during the steps between 2003 and 2006. To copy the remaining objects, under one method, the user instructs the donee storage system 1b to retrieve any objects that were created after the time at which step 2003 is started.

Step 2009: Once the secondary migration has completed, the user receives notification that migration is complete, such as by receiving at the host or at a management terminal, or the like.

Step 2010: The user or host 2 receives the object mapping information 700 from the donee storage system 1b. Based on the mapping information, the contents management information 800 is updated so that each object in the donee storage system 1b may be accessed using the new object ID 805 that is assigned by the donee storage system 1b.

Step 2011: After step 2010 is completed, the user restarts AP 21 and the process ends. After the process is completed, the user may remove the donor storage system 1a from the system.

Figure 11:
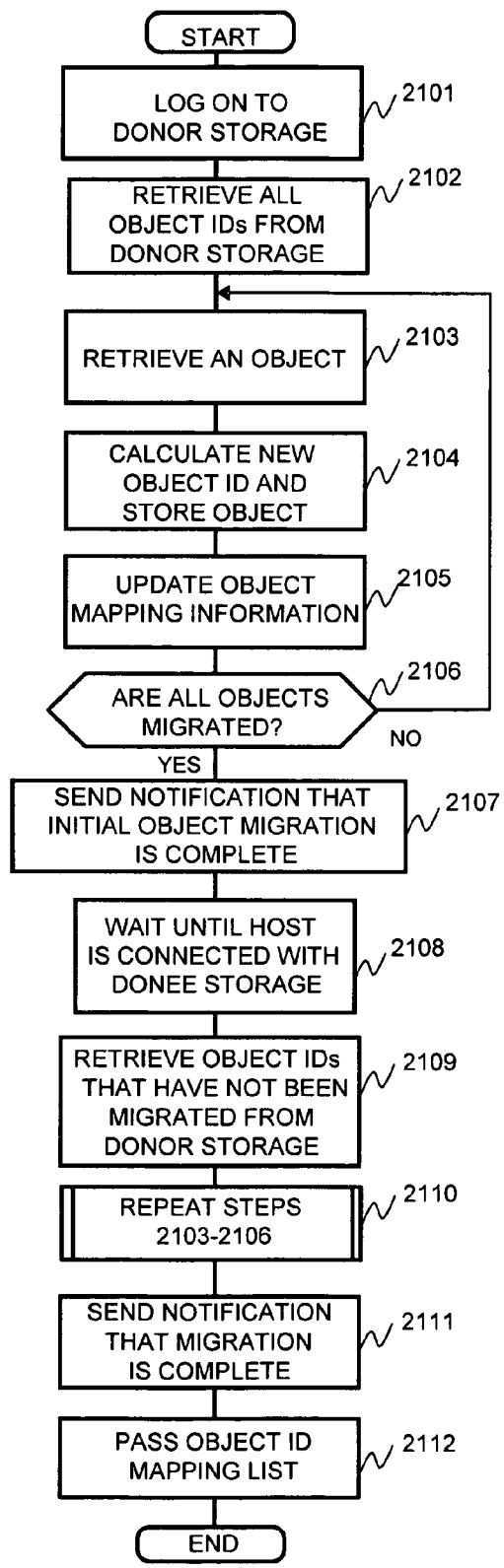
FIG. 11 illustrates a process flow of the migration operation in the second embodiment that is executed in the donee storage system.

FIG. 11 shows the flow of the migration operation in the second embodiment that is executed in the donee storage system 1b. FIG. 11 includes the following steps:

Step 2101: This step is the same as step 1101 described above.

Step 2102: Similar to step 1102, the migration processing module 113 retrieves a list of object IDs from the donor storage system 1a. But the received list of object IDs at this step contains the object IDs that were in existence in the donor storage system 1a at the time just before the step 2002 in FIG. 10 is executed by user, i.e., just before the AP 21 was stopped. The object IDs that will be generated after the step 2002 are not received by the migration processing module 113 at this step. Accordingly, under the invention of this embodiment, the AP 21 is stopped, the migration processing module obtains a list of object IDs, and the AP 21 may then be restarted. The time at which the AP 21 is restarted is noted so that any objects created after that time will be able to be retrieved during step 2109.

Step 2103: Similar to step 1103, the migration processing module 113 retrieves each object from the donor storage system 1a based on the list of the object IDs.

Step 2104: Same as step 1104.
Step 2105: Same as step 1105.
Step 2106: Same as step 1106.
Step 2107: Similar to step 1107, the migration processing module 113 sends a notification to the user or host that the initial migration is complete and the user then carries out steps 2005-2007 in FIG. 10.
Step 2108: The migration processing module 113 waits until the user has carried out steps 2005-2007 in FIG. 10, and the process is then ready to proceed to step 2109.
Step 2109: The process is invoked by the host 2 or user. At step 2008 in FIG. 10, when the user instructs the donee storage system 1b to start migrating remaining objects, the process starts. The process is also similar process to step 1102 in the first embodiment. The migration processing module 113 retrieves the list of object IDs from the donor storage system 1a. The object IDs that are received at this step are the object IDs of objects that were created by the host 2 on the donor storage system 1a between the steps 2003 and 2006 of FIG. 10.
Step 2110: At this step, steps 2103 through 2106 described above are executed repeatedly until all the additional objects have been migrated.
Step 2111: Same as step 1107.
Step 2112: Same as step 1108.

Third Embodiment

Figure 12:
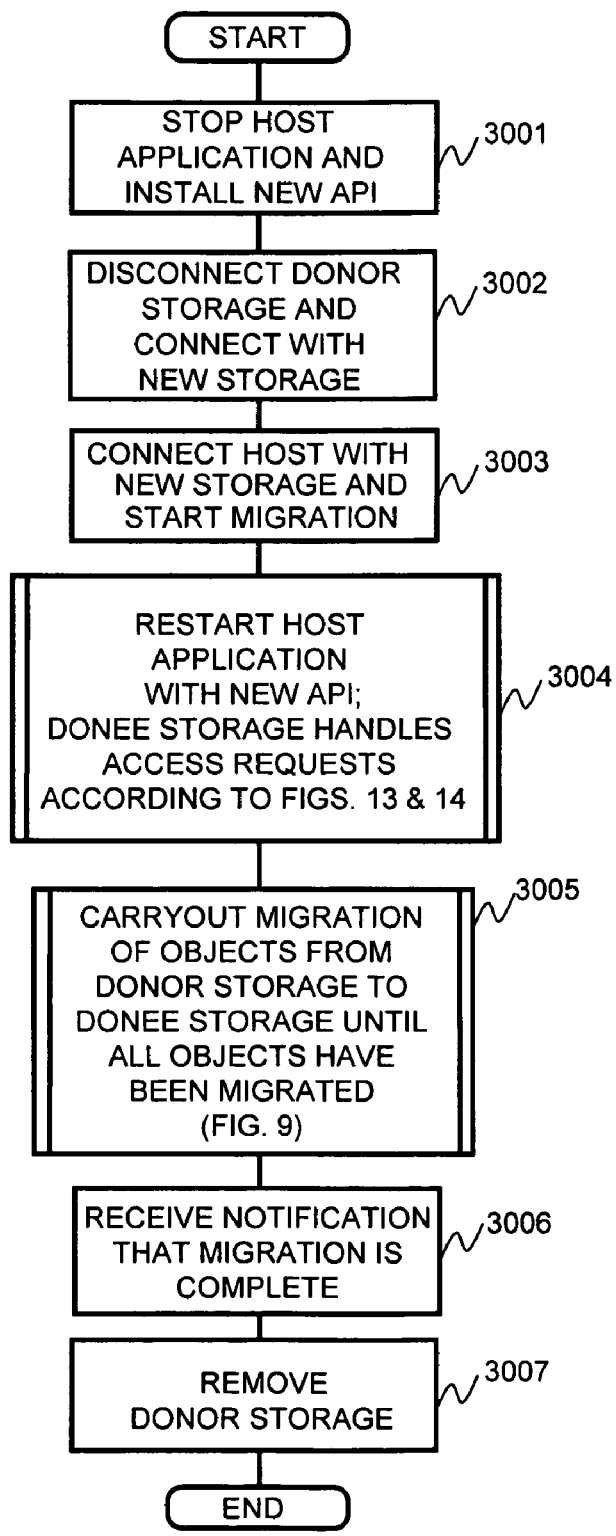
FIG. 12 illustrates an overview of the migration operation in the third embodiment.

Under the second embodiment of the invention, the downtime of AP 21 on host 2 is shorter than under the first embodiment of the invention, but downtime still exists between steps 2006 and 2011. In the third embodiment, the migration is performed almost on-line with minimal downtime. Similar to the second embodiment, the third embodiment is useful in systems in which the host does not update or overwrite objects once they have been written to the donor storage system 1a, such as in the case of a WORM (write once, read many) system. In the third embodiment, the host writes any new objects to the donee storage 1b, while the existing objects are migrated from the donor storage to the donee storage. Further, should the host request access to an object that has not yet been migrated, the donee storage retrieves the object from the donor storage and returns the object to the host. FIG. 12 shows the overview of the migration operation in the third embodiment, and includes the following steps:
Step 3001: Similar to step 2006, the user stops AP 21 and installs new API2 22b. The user may also install a new or modified version of AP 21 that is configured to work with API2 22b.
Step 3002: Similar to step 1002, the user disconnects the donor storage system 1a from LAN 3, and connects the donor storage 1a to the donee storage system 1b.
Step 3003: Similar to step 1003, the user connects host 2 with one storage system 1b. After the connecting operation, the user instructs the donee storage system 1b to start migration.
Step 3004: The user restarts AP 21. AP 21 accesses the donee storage system 1b via API2 22b. How the donee storage system 1b handles access requests is set forth in detail in FIGS. 13 and 14.
Step 3005: The migration of objects is carried out from donor storage system 1a to donee storage system 1b using essentially the same process set forth in detail in FIG. 9, until all objects have been migrated. Accordingly, since FIG. 9 has been described above with respect to the first embodiment, it will not be described again here. Once all objects are migrated, notification is sent from the donee storage system 1b to the user.
STEP 3006: The user receives notification that the migration of objects from donor storage system 1a to donee storage system 1b is complete.
Step 3007: The user may remove the donor storage system 1a from the system.

Thus, when the migration starts at step 3003, the donee storage system 1b starts copying data from the donor storage system 1a. The process of migrating objects to the donee storage system 1b is almost the same as that of the first embodiment (FIG. 9), except that step 1108 (passing of object ID mapping) is not necessarily executed unless host 2 or the user explicitly makes a request to retrieve the object mapping information 700. Thus, the donee storage system 1b may maintain the mapping information 700 and use this to fulfill access requests. Alternatively, once migration is complete, the donee storage system 1b may pass the mapping information 700 to host 2 or the user so that table 800 can be updated. Also, in the third embodiment, the donee storage system 1b is able to process read/write requests while the migration process is being carried out, while in the first embodiment the AP 21 was stopped during the migration process. This substantially eliminates downtime of the AP 21 and host 2, with the exception of the time required to install API 22b and connect donee storage 1b to host 2.

Figure 13:
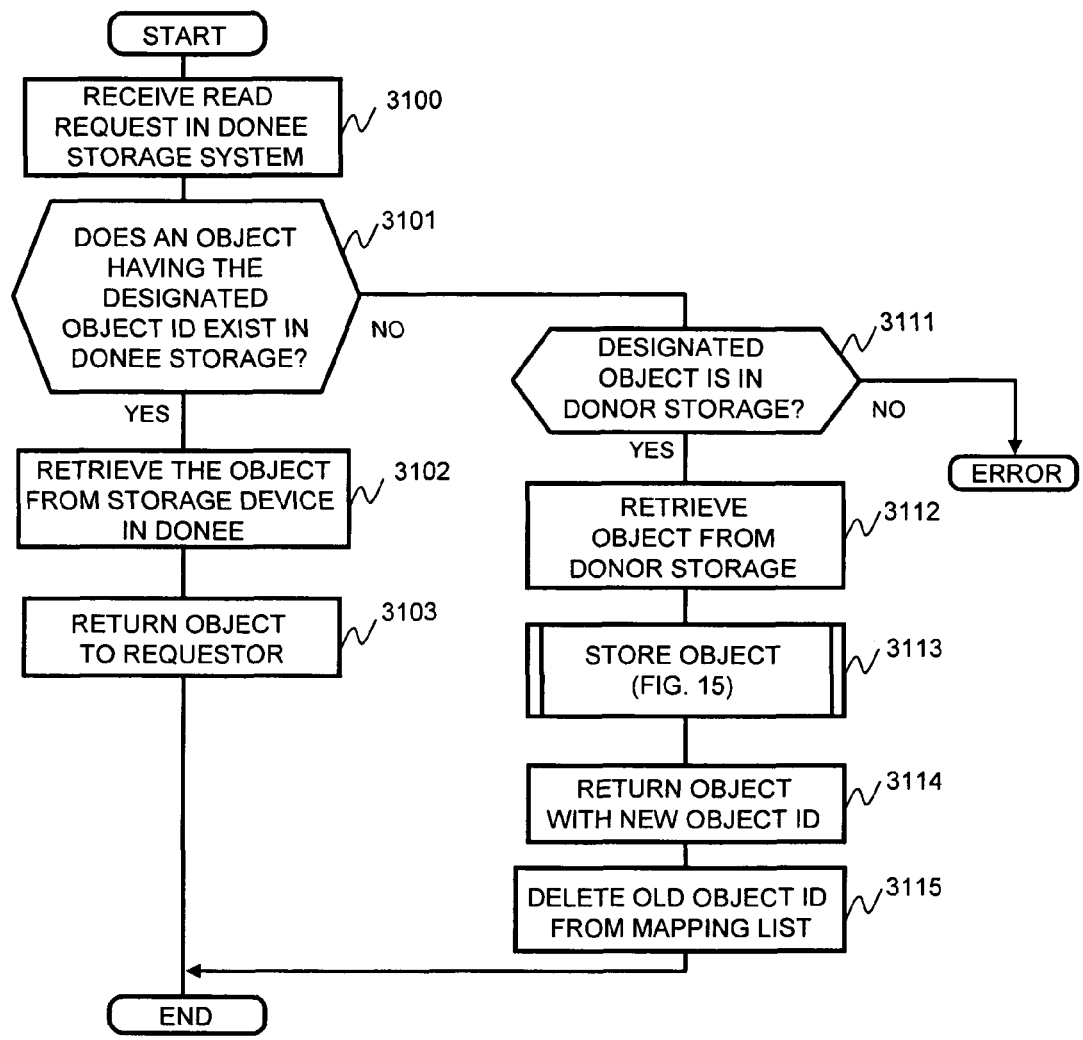
FIG. 13 illustrates a process flow of the operation executed in the donee storage system when the donee storage system receives a read request from the host.

FIG. 13 illustrates the process flow of the operation executed in the donee storage system 1b when the donee storage system 1b receives a read request from host 2. The process of FIG. 13 includes the following steps:
Step 3100: The donee storage system 1b receives a read request for an object from host 2. The read request designates the object according to the object ID of the object.
Step 3101: When the command processing module 111b of donee storage system 1b receives the read request, it checks whether the donee storage system 1b maintains the object having the object ID designated by the host 2 in the read request. The determination is made by checking whether the object ID designated by the host 2 is included in the object ID column 601 in the object management table 600. If command processing module 111b determines that the donee storage system 1b maintains the designated object, the process proceeds to step 3102. However, if the object ID is not located in the object ID column 601 in the object management table 600, the process goes to step 3111.
Step 3102: Since the designated object is already in the donee storage system 1b, the command processing module 111b retrieves the object corresponding to the designated object ID from storage devices 17 in the donee storage system 1b using the information in the object management table 600.
Step 3103: The command processing module 111b returns the retrieved object to the requestor.
Step 3111: If the object is not located in the donee storage system 1b, the command processing module 111b then checks whether the object ID designated in the request from host 2 is included in the list of object IDs that were received from the donor storage system 1a at step 1102 (in FIG. 9) when the migration process is started. If the designated object ID is located in the list, the process proceeds to step 3112. If not, the command processing module 111b terminates and returns an error to API2 22b since it was unable to locate the object in either the donee storage system 1b or the donor storage system 1a.
Step 3112: The command processing module 111b instructs the migration processing module 113 to migrate the designated object from the donor storage system a. The migration processing module 113 retrieves the object corresponding to the designated object ID from the donor storage system 1a.

Step 3113: The migration processing module 113 calculates a new object ID and stores the object (both the content and the metadata including the new object ID for each object) into storage devices 17 in donee storage system 1b. The calculation of a new object ID is performed so that the calculated object ID cannot coincide with the object IDs that have already been created by the donee storage system 1b or the donor storage system 1a. Details of the process carried out in this step are set forth with reference to FIG. 15 below.

Step 3114: The command processing module 111b returns the object with the new object ID calculated at step 3113.

Step 3115: The command processing module 111b deletes the object ID information stored in the former object ID column 604 in the object management table 600. In another embodiment, step 3115 may not exist (the object ID information may not be removed from the object management table 600) and the donee storage system 1b maintains the object mapping information so that the object IDs to be calculated in the donee storage system 1b in future cannot coincide with the object IDs that have already been created by the donor storage system 1a.

In accordance with the process above, when AP 21 issues a request to read an object that has already been migrated from the donor storage system 1a to the donee storage system 1b, AP 21 receives the updated object ID in response to the read request. When AP 21 receives the updated object ID, AP 21 updates the row of the database table 800 where the corresponding object ID information 805 is stored. After the object ID information is updated, the next time AP 21 reads the object, it can issue the read request using the new object ID. Therefore, in the migration method of the third embodiment, a modified version of AP 21 should be installed at step 3001 so that when AP 21 receives the updated object ID from API2 22b, AP 21 updates the contents of the database table 800.

Figure 14:
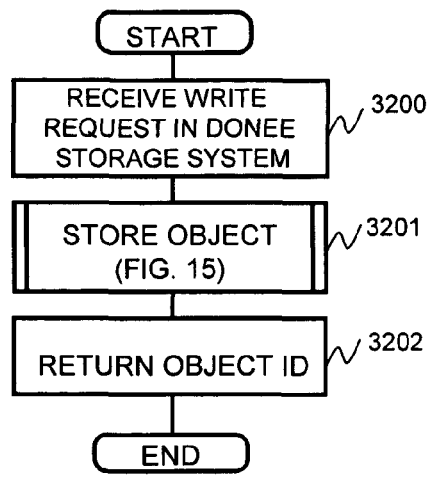
FIG. 14 illustrates a process flow of the operation executed in the donee storage system when the donee storage system receives an object write request from the host.

FIG. 14 illustrates the flow of the process executed in the donee storage system 1b when the donee storage system 1b receives an object write request from host 2. FIG. 14 includes the following steps:

Step 3200: The donee storage system receives an object write request from host 2.

Step 3201: Similar to step 3113 described above, the migration processing module 113 calculates a new object ID and stores the object (both the content and the metadata including the new object ID for each object) into storage devices 17 in donee storage system 1b. Details of the process carried out in this step are set forth with reference to FIG. 15 below.

Step 3202: The command processing module 111b returns the object ID that is associated with the newly created object.

Figure 15:
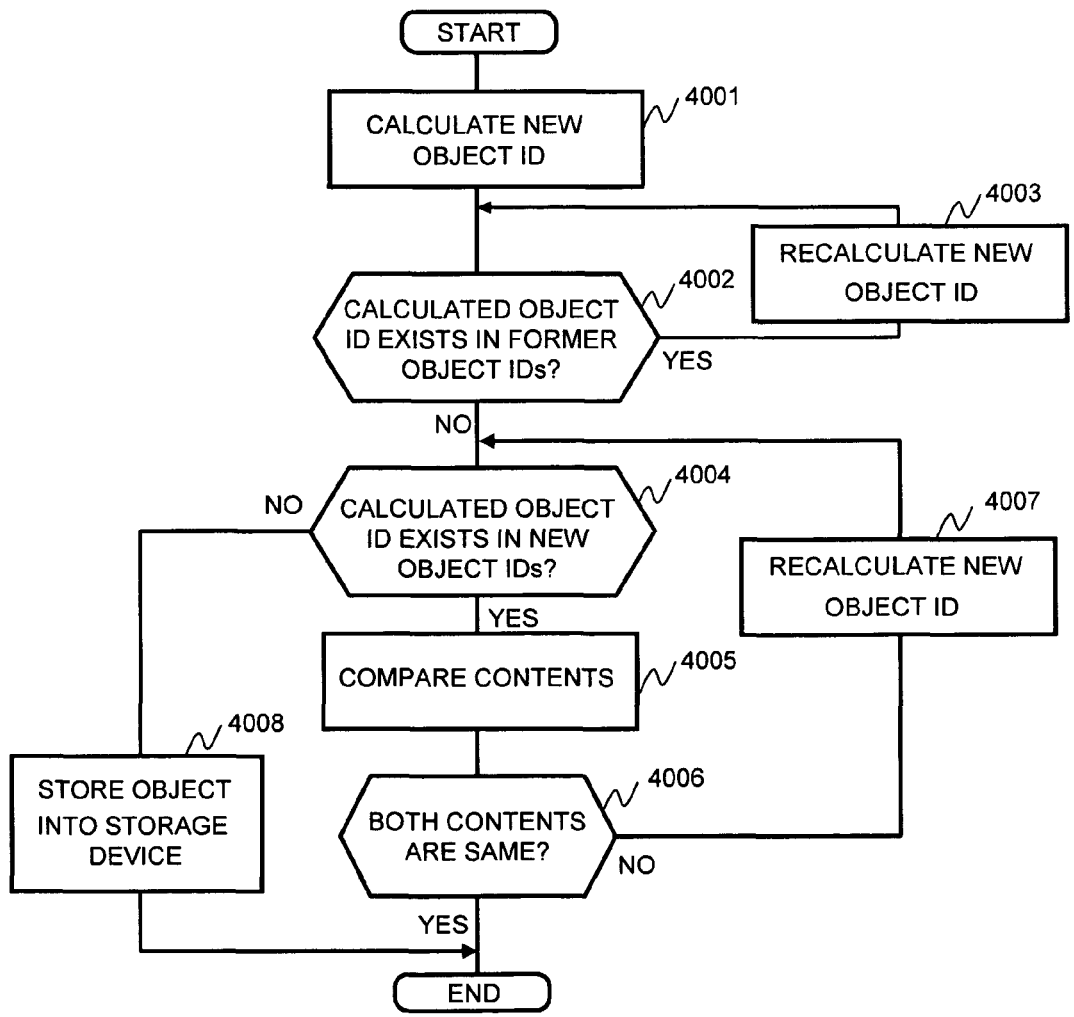
FIG. 15 illustrates a process flow of steps 3113 and 3201 of FIGS. 13 and 14, respectively.

FIG. 15 illustrates the process flow carried out in the donee storage system 1b during step 3113 or step 3201, and includes the following steps:

Step 4001: The command processing module 111b calculates the new object ID based on the content 210 of the object.

Step 4002: If the calculated object ID coincides with one of the object IDs that is already recorded in the former object ID column 604 in the object management table 600 (the object IDs that were already stored in the donor storage system 1a), the process goes to 4003 to recalculate the new object ID so as not to coincide with any of the former object IDs. This way, a former object and a new object will not have the same ID, which otherwise might cause confusion from a host's perspective when trying to access an object. When the calculated object ID does not equal any of the former object IDs, the process goes to step 4004.

Step 4003: The process recalculates the object ID and goes back to step 4002 to check if the re-calculated object ID is equal to the other object IDs already stored.

Step 4004: If the calculated object ID coincides with one of the object IDs that is already recorded in the object ID column 601 in the object management table 600 (the object IDs that are stored in the donee storage system 1b), the process proceeds to step 4005. When the calculated object ID does not equal any of the object IDs already stored, the process goes to step 4008 to store the object into the storage device 17.

Step 4005: The process reads the content of the object from the storage device 17 whose object ID is determined to be equal (at step 4004) to the object ID calculated at step 4001 (or at step 4003 or 4007), and compares the content with the content of the object that is to be written in the process.

Step 4006: If both of the contents that were compared at step 4005 are completely equal, the process terminates without storing the object since the same content is already stored in the storage device 17. If not, the process goes to step 4007 to recalculate the new object ID so as not to coincide with other object IDs.

Step 4007: This is a similar process to step 4003. The process recalculates the object ID and goes back to step 4004 to check if the re-calculated object ID is equal to the other object IDs already stored.

Step 4008: When it has been determined that there is no coincidence of object IDs, the command processing module 111b stores the object to storage devices 17 by storing both the content and metadata including the new object ID.

Thus, it may be seen from the foregoing that the present invention sets forth a novel method to enable data migration between CAS systems. Additionally, the invention sets forth methods for minimizing downtime during the migration process. Further, while specific embodiments have been illustrated and described in this specification, those of ordinary skill in the art appreciate that any arrangement that is calculated to achieve the same purpose may be substituted for the specific embodiments disclosed. This disclosure is intended to cover any and all adaptations or variations of the present invention, and it is to be understood that the above description has been made in an illustrative fashion, and not a restrictive one. Accordingly, the scope of the invention should properly be determined with reference to the appended claims, along with the full range of equivalents to which such claims are entitled.

What is claimed is:

1. A method for migrating data from a first storage system to a second storage system, wherein the data is stored as objects, wherein each object is made up of content and metadata, and wherein each object is stored according to a unique object ID (identifier) calculated based upon the content, the method comprising:

receiving, in the second storage system, a list of object IDs of objects stored in the first storage system;

retrieving, by the second storage system, an object from the first storage system by designating the object ID;

calculating, by the second storage system, a new object ID for the retrieved object based upon the content of the object retrieved;

storing the content and metadata for the object retrieved in the second storage system;

repeating the retrieving, calculating and storing steps for each object in said list until all objects in said list are migrated from the first storage system to the second storage system, wherein the first storage system and the second storage system are contents addressable storage systems, and the object ID identifies a content address of the object without regard to physical location of the data associated therewith;

stopping an application program on a host computer prior to migrating the data;

installing an application interface program on the host computer for use in interfacing with the second storage system prior to restarting the application program; and placing the second storage system into communication with the host computer;

wherein, when the second storage system receives a read request for an object, the second storage system determines whether the object is stored in the second storage system or in the first storage system;

wherein when the object is stored in the first storage system, the second storage system:

retrieves the object from the first storage system;

calculates a new object ID for the retrieved object based upon the content of the retrieved object;

stores the content and metadata for the retrieved object in the second storage system; and returns the object and the new object ID in response to the request.

2. The method according to claim 1, further comprising:
updating mapping information for mapping relationships between former object IDs and new object IDs; and
when all objects on the list have been migrated to the second storage system, sending notification of completion of migration to a user.

3. The method according to claim 2, further comprising:
passing the mapping information from the second storage system to an application program on a host computer, whereby the application program uses said mapping information to update object management information used by the application program.

4. The method according to claim 1, further comprising:
disconnecting the first storage system from communication with the host computer.

5. The method according to claim 1,
wherein when the object is stored in the second storage system, the second storage system:
retrieves the object; and
returns the object in response to the request.

6. The method according to claim 1,
wherein, when the second storage system receives a write request for an object, the second storage system:
calculates a new object ID for the object based upon the content of the object;
stores the content and metadata for the retrieved object in the second storage system; and
returns the new object ID in response to the request.

7. The method according to claim 1,
wherein a method of calculating the object ID in the first storage system differs from a method of calculating the object ID in the second storage system.

8. The method according to claim 1, further comprising:
restarting the application program on the host computer when all objects on said list have been stored in said second storage system.

9. The method according to claim 1, further comprising:
starting a newly installed application program on the host computer when all objects on said list have been stored in said second storage system.

10. The method according to claim 1,
wherein different objects with different contents have different unique object IDs calculated based on the different contents.

* * * * *